Oct. 12, 1965 P. A. KEITH 3,210,919
MOISTENER MEANS FOR COTTON PICKING SPINDLES
Filed Aug. 19, 1963 2 Sheets-Sheet 1

INVENTOR,
PERCY A. KEITH

Oct. 12, 1965   P. A. KEITH   3,210,919
MOISTENER MEANS FOR COTTON PICKING SPINDLES
Filed Aug. 19, 1963   2 Sheets-Sheet 2
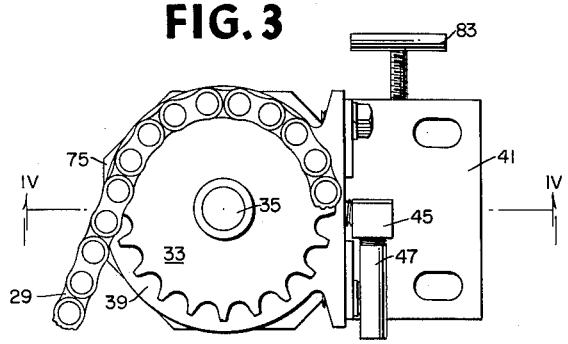
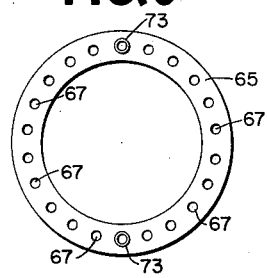
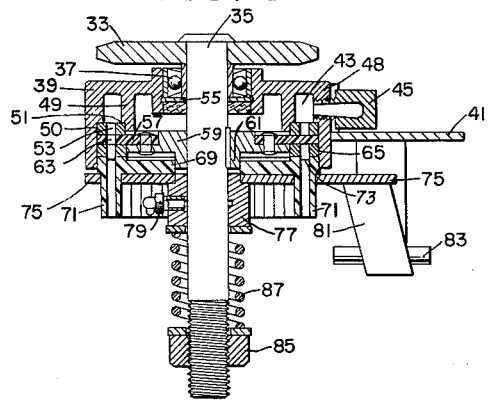
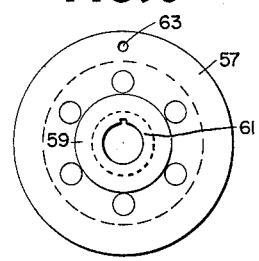
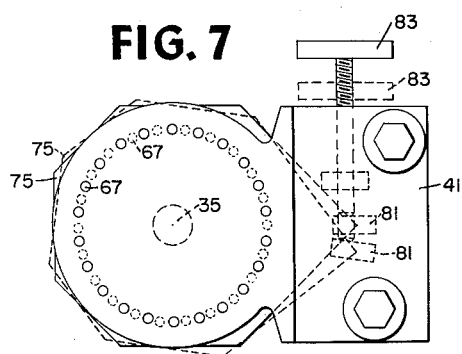
INVENTOR,
PERCY A. KEITH
BY
Weatherford & Weatherford
Attys United States Patent Office 3,210,919
Patented Oct. 12, 1965

3,210,919
MOISTENER MEANS FOR COTTON PICKING SPINDLES
Percy A. Keith, Pine Bluff, Ark., assignor to Ben Pearson, Incorporated, Pine Bluff, Ark., a corporation of Arkansas
Filed Aug. 19, 1963, Ser. No. 302,893
6 Claims. (Cl. 56—41)

This invention relates to certain new and useful improvements in means for distributing moisture to series of spindles, particularly such as those as were used in cotton picking machines. Cotton picking machines are provided with a number of rotatable spindles which are adapted to engage the fiber of the cotton, and upon rotation in such engagement to remove the fiber from the cotton plant. It is found desirable to moisten the spindles in order to enhance the ability to engage the fiber of the cotton plants, and previously a number of attempts have been made toward furnishing moisture to rotating cotton picking spindles.

The present device is particularly adapted for use in connection with a well known type of cotton picking machine illustrated, in which the spindles are arranged in vertically disposed series of groups, each series of spindles being supported by a so-called slat which is connected with an endless conveyor means for moving the group of spindles through the cotton picking machine.

The present device contemplates an exact and accurate delivery of moisture to each of the respective spindles through driven means, the drive of which is synchronized with the drive of the spindles through the machine with the conveyor.

The principal object of the present invention is to provide a new and useful means for accurately delivering moisture to spindles of cotton picking machines.

A further object of the invention is to provide such a device in which the moisture is furnished to the spindles through individual tubes to each of the spindles.

A further object of the invention is to provide distributing means in conjunction with the tubes which includes means driven for sequentially delivering moisture to individual successive spindles.

A further object of the invention is to provide such a device in which the distributor includes means shiftable relative to the remainder of the distributor for modifying the amount of the moisture fed to the spindles.

A further object of the invention is to provide such a device in which the distributing means includes a pair of rings which are spaced apart, each ring being apertured with apertures corresponding in number to the number of spindles in a vertical bank, one of these rings being shiftable relative to the other of the rings in order to vary the amount of registry between the apertures and thus to control the amount of flow of moisture to the spindles.

A further object of the invention is to provide such a device in which the distributor includes a disc interposed between the two rings, the disc having a single aperture corresponding in size to the apertures in the rings and being mounted upon a driven shaft which is coupled to a sprocket driven from the main drive of the rings and being mounted upon a driven shaft which is coupled to a sprocket driven from the main drive of the cotton picking machine; and A further object of the invention is generally to improve the design, construction and efficiency of means for distributing moisture to cotton picking spindles.

The means by which the foregoing and other objects of the present invention are accomplished and the manner of their accomplishment will be readily understood from the following specification upon reference to the accompanying drawings, in which:

FIG. 3 is a fragmentary top plan view on an enlarged scale of the distributor means.

FIG. 4 is a fragmentary sectional view illustrating details of the invention.

FIG. 5 is a view of one of the rings employed in the distributor assembly.

FIG. 6 is a view of the distributor disc employed in the distributor assembly.

FIG. 7 is a fragmentary and somewhat schematic plan view illustrating adjustment modifying flow volume.

Figures 1, 2:
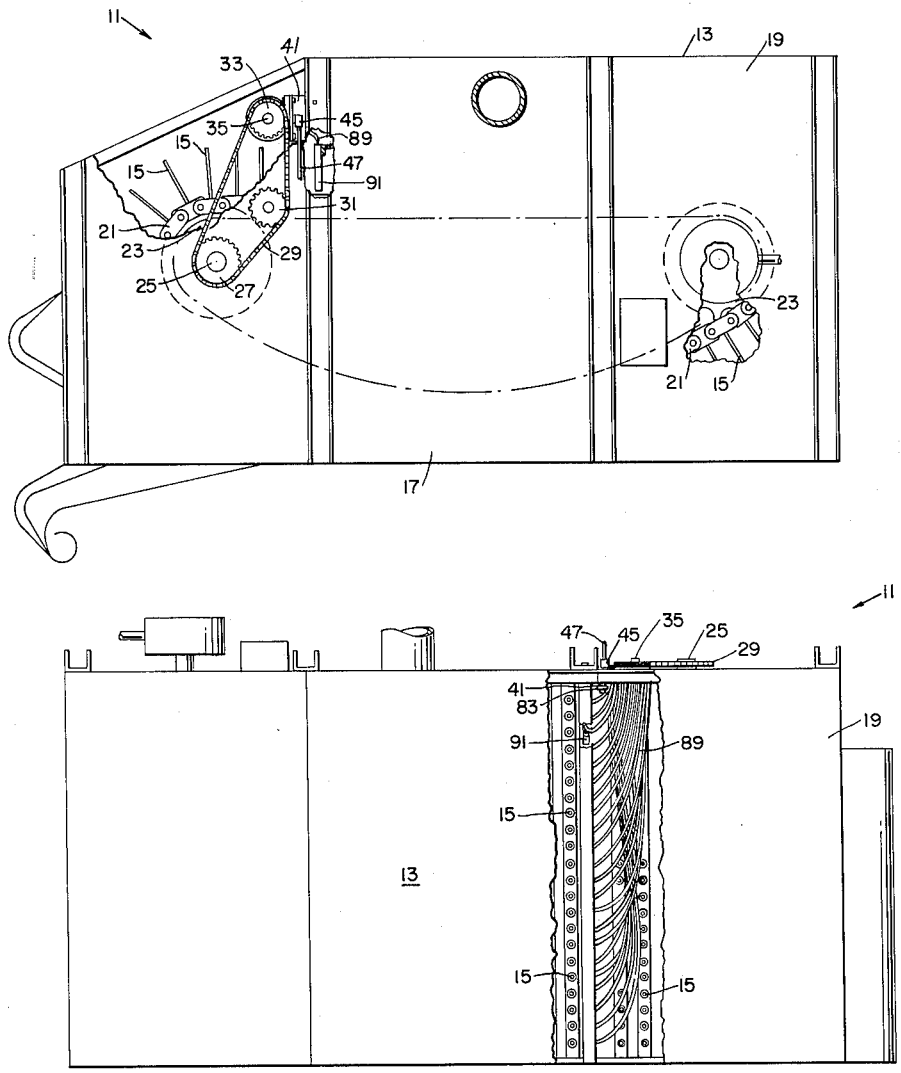
FIG. 1 is a top plan view with parts broken away for purposes of illustration of a cotton picking machine embodying the present invention.
FIG. 2 is a fragmentary side view illustrating the installation of the invention relative to the cotton picking machine.

Referring now to the drawings in which the various parts are indicated by numerals, the present invention is shown as employed in connection with a cotton packing machine 11 having a casing 13 within which are contained the instrumentalities of the cotton picking machine. The machine includes a plurality of rotatably supported cotton picking spindles 15 supported in vertically arranged groups or banks each comprising a series of horizontally disposed spindles, each of the series of spindles being supported from an endless conveyor means by which the spindles are transported through the cotton picking machine. At one side 17 of the machine the spindles are moved through the picking zone into picking engagement with the fiber on the cotton stalks to remove the same therefrom. On the opposite side 19 the spindles are passed through a stripping zone where the picked cotton is removed from the spindles for ultimate discharge from the cotton picking machine.

The present distributor means are mounted on the stripping side 19 of the machine forwardly of the stripper bars between which the spindles are passed in the stripping zone to remove the cotton therefrom and are disposed so as to recondition the spindles for re-entry into the picking zone and more efficient operation of removing the cotton from the plants.

The main conveyor means of the machine 11 includes a chain 21 preferably at the top of the machine which is trained about and driven by sprockets 23 at front and rear of the machine. Sprocket 23 is carried upon a shaft 25 to which it is fixed. Shaft 25 extends above sprocket 23, and a sprocket 27 is connected thereto and driven thereby. The distributor means is mounted upon the machine adjacent the outer edge thereof and extends thereabove. A chain 29 is trained about and driven with sprocket 27, and is further trained about an idler sprocket 31 and thence about a sprocket 33 forming part of the distributor assembly and by which the distributor is driven in synchronization with the drive of the conveyor and hence the drive of the spindles as they are moved through the machine.

Sprocket 33 is mounted upon and fixed to a substantially vertically disposed shaft 35 which is journaled in bearing 37 mounted within distributor housing 39. Housing 39 is connected as by a suitable bracket 41 to the frame of machine 11 so that the distributor means are connected with the machine and supported therefrom adjacent the outer edge of the machine.

Distributor housing 39 within the upper part of its interior is upwardly recessed to form an annular manifold channel 43 which is connected through a suitable fitting 45 to a pipe 47 communicated with a source of moisture supply such as a water tank (not shown). Channel 43 extends annularly around the interior of housing 39, is downwardly open, and is defined by a downwardly extending outer shoulder 48, and an inner shoulder 49. Mounted in housing 39 is a ring 50 which seats solidly at the edges of its upper face against shoulders 48, 49 forming part of the housing 39.

Ring 50 is provided with a plurality of circumferentially equally spaced ports 53 which are in communication with the downwardly open channel 43 to receive therefrom the moisture in the form of water or other liquid that may be fed into the manifold channel. Housing 39, adjacent and spaced inwardly from channel 43, is provided with a retainer 55 which fits closely within the inner periphery of the innermost part of the housing so as to retain the same in proper position.

Ring 50 is fixed to housing 39 preferably through the means of a suitable sealer and attaching means applied to the upper surface of the ring and affixing the same to the shoulders 48, 49. It will be understood that other means of fixing the ring to the housing may be employed if desired, either separately or in conjunction with the sealing means just mentioned.

Adjacent to ring 50 a disc 57 is mounted in sliding contact with the lower face of ring 50. Disc 57 is carried by a central bushing 59 which includes a depending collar portion 61. Bushing 59 and its collar 61 snugly fit shaft 35 and are keyed thereto so as to fix disc 57 to the shaft for drive thereby and rotation therewith. Disc 57 is provided with a single port 63 which is spaced radially inwardly from the edge of the disc so as to be successively moved into register with the ports 53 of ring 50.

Below disc 57 and snugly contained within housing 39 is a lower ring 65, which is substantially similar to ring 50 and includes an identical number of ports 67 spaced and arranged for registering alinement with ports 53. Detachably secured to the underside of ring 65 is a nipple head 69 which includes a plurality of depending nipples 71 equal in number to ports 67 and ports 53. Nipple head 69 extends inwardly and closely, yet turnably, embraces collar 61 of bushing 59. Nipple head 69 and ring 65 are coupled together for joint shifting movement, preferably ring 65 being provided with a pair of downwardly extending hollow stubs 73 which are disposed diametrically opposite on the lower face of ring 65 in registry with a pair of ports 67 and are extended into a pair of diametrically disposed nipples 71, effectively locking ring 65 to nipple head 69.

A plate 75 is closely fitted against the underside of nipple head 69 and is apertured to receive and provide for the extension of nipples 71 therethrough. Extending below plate 75 is a centrally open bushing 77 to which is connected a suitable lubrication fitting 79 for suitable lubrication of the device as desired.

An abutment 81 is rigidly connected to and depends from the lower face of plate 75 outwardly from the periphery of housing 39. A thumb screw 83 is connected with the frame of the cotton picking machine adjacent its outer edge and adjacent the present distributor means. The thumb screw extends inwardly through suitable supporting means into engagement with abutment 81 so as to provide for adjusting shift of plate 75 and nipple head 69 and lower ring 65, all coupled thereto to establish desired degree of registration of the apertures in the respective rings. The thrust adjustment of the thumb screw 83 is such as to effect shift of the nipple head and ring 65 in a direction opposed to the direction of drive rotation of shaft 35 under drive of sprocket 33.

Shaft 35 extends downwardly through the housing and below, extending through bushing 77. At its lower end shaft 35 is provided with an adjustable head preferably in the form of a nut 85 threadedly engaged therewith, and providing a seat for a compression spring 87, the upper end of spring 87 bearing against the lower end of bushing 77. Thus the tension upon the members of the distributor means may be established by the adjustment of the tension on the spring 87 so as to hold the members positively in place and against displacement, as well as to provide for the desired tension on shaft 35 for rotation under drive.

Connected to each of the nipples 71 and depending therefrom is a tube 89, the tubes 89 respectively leading to moistener pads 91 which are arranged in a vertical bank so as to have the spindles 15 successively pass therethrough in order to be moistened and wiped by the action of the moistener pads to ready the spindles for entry into the picking zone on the opposite side of the picking machine.

With the device thus assembled, ports 67 of ring 65 are positioned normally in registry with ports 63 of ring 50, and are spaced apart by the intervening disc 57. As the cotton picking machine is operated the drive of the spindle conveyor effectively drives sprocket 33 in synchronization with the movement of the spindles relative to the machine, the drive of sprocket 33 rotating disc 57 so as successively to move its single port 63 into registry with the ports of upper and lower rings 50, 65. As port 63 moves into registry successively with the ports of rings 50, 65, the moisture fed into channel 43 is successively fed to the respective nipples and through the respective tubes successively to the moistener pads of the banks of pads. In this manner a full flow of moisture to each moistener pad is insured in an equal manner for the entire bank of moistener pads.

If it is found that the flow to the pads is somewhat in excess of that needed, adjustment of the flow may be made by adjustment of the thumb screw 83 so as to move lower ring 65 slightly out of registry with upper ring 50. In this manner, with the ports not being in full registry, the flow of water is reduced or metered as the successive passing of disc aperture 63 is accomplished. If it is desired to reset the rings for adjusted flow, the thumb screw may be backed off so that in operation the lower ring is shifted toward full registry with the upper ring. Such adjustment may conveniently be made so as to vary the moisture flow to the pads to the degree desired by the operator.

I claim:

1. Means for moistening the spindles in a cotton picking machine having a main spindle drive to move the spindles through the machine, which comprises a vertical bank of moistener pads disposed in the path of travel of the spindles through the machine, a distributor including a housing having an annular downwardly open channel communicated with a source of moisture, a flat ring fixed to said housing at the open bottom of said channel, said ring being apertured to provide a series of circumferentially spaced ports communicating with said channel for passage of moisture therefrom, a metering ring shiftably mounted in said housing below the first ring apertured to provide a like series of ports adapted for registering alinement with the first said ports, a rotatable distributor disc interposed between and in close sliding contact with said rings, said disc having a single port moved into successive register with the ports of the respective said rings during disc rotation, drive means connected to said disc for effecting disc rotation, said drive means being synchronized with and driven by the main drive of the machine, means for shifting said metering ring to establish the degree of registered alinement between the ports of the respective rings, said disc blocking flow between said rings except when said disc rotation successively moves said disc port into registry with the ring ports establishing communication of the moisture in said channel through the successive ports of the metering ring, a nipple head fixed to said metering ring, a plurality of nipples projecting below said head, said nipples respectively held in communication with the metering ring ports, tubing means respectively connecting said nipples to said moistener pads so that moisture is successively delivered to the respective said pads during disc drive, said degree of ring port alinement controlling the quantity of moisture successively delivered to said pads.

2. Means for moistening the spindles in a cotton picking machine having a main spindle drive to move the spindles through the machine, which comprises a vertical bank of moistener pads disposed in the path of travel of the spindles through the machine, a distributor including a housing having an annular downwardly open channel communicated with a source of moisture, a flat ring fixed to said housing at the open bottom of said channel, said ring being apertured to provide a series of circumferentially spaced ports communicating with said channel for passage of moisture therefrom, a metering ring shiftably mounted in said housing below the first ring apertured to provide a like series of ports adapted for registering alinement with the first said ports, a rotatable distributor disc interposed between and in close sliding contact with said rings, said disc having a single port moved into successive register with the ports of the respective said rings during disc rotation, drive means connected to said disc for effecting disc rotation, said drive means being synchronized with and driven by the main drive of the machine, means for shifting said metering ring to establish the degree of registered alinement between the ports of the respective rings, said disc blocking flow between said rings except when said disc rotation successively moves said disc port into registry with the ring ports establishing communication of the moisture in said channel through the successive ports of the metering ring, a plurality of nipples projecting below said metering ring, said nipples being respectively held in communication with the metering ring ports, tubing means respectively connecting said nipples to said moistener pads so that moisture is successively delivered to the respective said pads during disc drive, said degree of ring port alinement controlling the quantity of moisture successively delivered to said pads.

3. Means for moistening the spindles in a cotton picking machine having a main spindle drive to move the spindles through the machine, which comprises a vertical bank of moistener pads disposed in the path of travel of the spindles through the machine, a distributor including a downwardly open housing communicated with a source of moisture, a flat ring fixed to said housing in communication with the moisture in said housing, said ring being apertured to provide a series of circumferentially spaced ports for passage of moisture therefrom, a metering ring shiftably mounted in said housing below the first ring apertured to provide a like series of ports adapted for registering alinement with the first said ports, a rotatable distributor disc interposed between and in close sliding contact with said rings, said disc having a single port moved into successive register with the ports of the respective said rings during disc rotation, drive means connected to said disc for effecting disc rotation, said drive means being synchronized with and driven by the main drive of the machine, means for shifting said metering ring to establish the degree of registered alinement between the ports of the respective rings, said disc blocking flow between said rings except when said disc rotation successively moves said disc port into registry with the ring ports establishing communication of the moisture in said housing through the successive ports of the metering ring, a nipple head fixed to said metering ring, a plurality of nipples projecting below said head, said nipples being respectively held in communication with the metering ring ports, tubing means respectively connecting said nipples to said moistener pads so that moisture is successively delivered to the respective said pads during disc drive, said degree of ring port alinement controlling the quantity of moisture successively delivered to said pads.

4. Means for moistening the spindles in a cotton picking machine having a main spindle drive to move the spindles through the machine, which comprises a vertical bank of moistener pads disposed in the path of travel of the spindles through the machine, a distributor including a downwardly open housing communicated with a source of moisture, a flat ring fixed to said housing in communication with the moisture in said housing, said ring being apertured to provide a series of circumferentially spaced ports for passage of moisture therefrom, a metering ring shiftably mounted in said housing below the first ring apertured to provide a like series of ports adapted for registering alinement with the first said ports, a rotatable distributor disc interposed between and in close sliding contact with said rings, said disc having a single port moved into successive register with the ports of the respective said rings during disc rotation, drive means connected to said disc for effecting disc rotation, said drive means being synchronized with and driven by the main drive of the machine, means for shifting said metering ring to establish the degree of registered alinement between the ports of the respective rings, said disc blocking flow between said rings except when said disc rotation successively moves said disc port into registry with the ring ports estalbishing communication of the moisture in said housing through the successive ports of the metering ring, a plurality of nipples projecting below said metering ring, said nipples being respectively held in communication with the metering ring ports, tubing means respectively connecting said nipples to said moistener pads so that moisture is successively delivered to the respective said pads during disc drive, said degree of ring port alinement controlling the quantity of moisture successively delivered to said pads.

5. Means for moistening the spindles in a cotton picking machine having a main spindle drive to move the spindles through the machine, which comprises a vertical bank of moistener pads disposed in the path of travel of the spindles through the machine, a distributor including a housing communicated with a source of moisture, a flat ring fixed within said housing, said ring being apertured to provide a series of circumferentially spaced ports communicating with the moisture in said housing for passage of moisture therefrom, a metering ring shiftably mounted in said housing below the first ring apertured to provide a like series of ports adapted for registering alinement with the first said ports, a rotatable distributor disc interposed between and in close sliding contact with said rings, said disc having a single port moved into successive register with the ports of the respective said rings during disc rotation, drive means connected to said disc for effecting disc rotation, means for shifting said metering ring to establish the degree of registered alinement between the ports of the respective rings, said disc blocking flow between said rings except when said disc rotation successively moves said disc port into registry with the ring ports establishing communication of the moisture in said housing through the successive ports of the metering ring, a plurality of nipples projecting below said metering ring, said nipples being respectively held in communication with the metering ring ports, tubing means respectively connecting said nipples to said moistener pads so that moisture is successively delivered to the respective said pads during disc drive, said degree of ring port alinement controlling the quantity of moisture successively delivered to said pads.

6. A moisture distributor for use in connection with the spindles of a cotton picking machine, comprising a housing, means connecting said housing to a source of moisture, a first ring within said housing, a second ring below said first ring, said rings being substantially identical and each including a like plurality of circumferentially spaced ports movable into and out of communicating register, one of said rings being shiftably mounted in said housing, means for shifting said one ring to modify the register between the respective said ports, a distributing disc having at least one port, said disc being rotatably supported and interposed between and in contact with said rings, means for driving said disc to move its said port into successive communication with said ring ports, and means for delivering moisture to the spindles connected with the bottom of said housing.

References Cited by the Examiner
UNITED STATES PATENTS 2,024,690 12/35 Harris.
2,433,083 12/47 Baker et al. _____ 56—41

ABRAHAM G. STONE, *Primary Examiner.*
RUSSELL R. KINSEY, *Examiner.*